April 26, 1932. G. W. B. BEAUCHAMP ET AL 1,855,817
TEMPERATURE MAINTAINING APPARATUS
Filed Sept. 16, 1931  3 Sheets-Sheet 1

G. Beauchamp &
R. Beauchamp
INVENTORS
By: Marks & Clerk Attys.

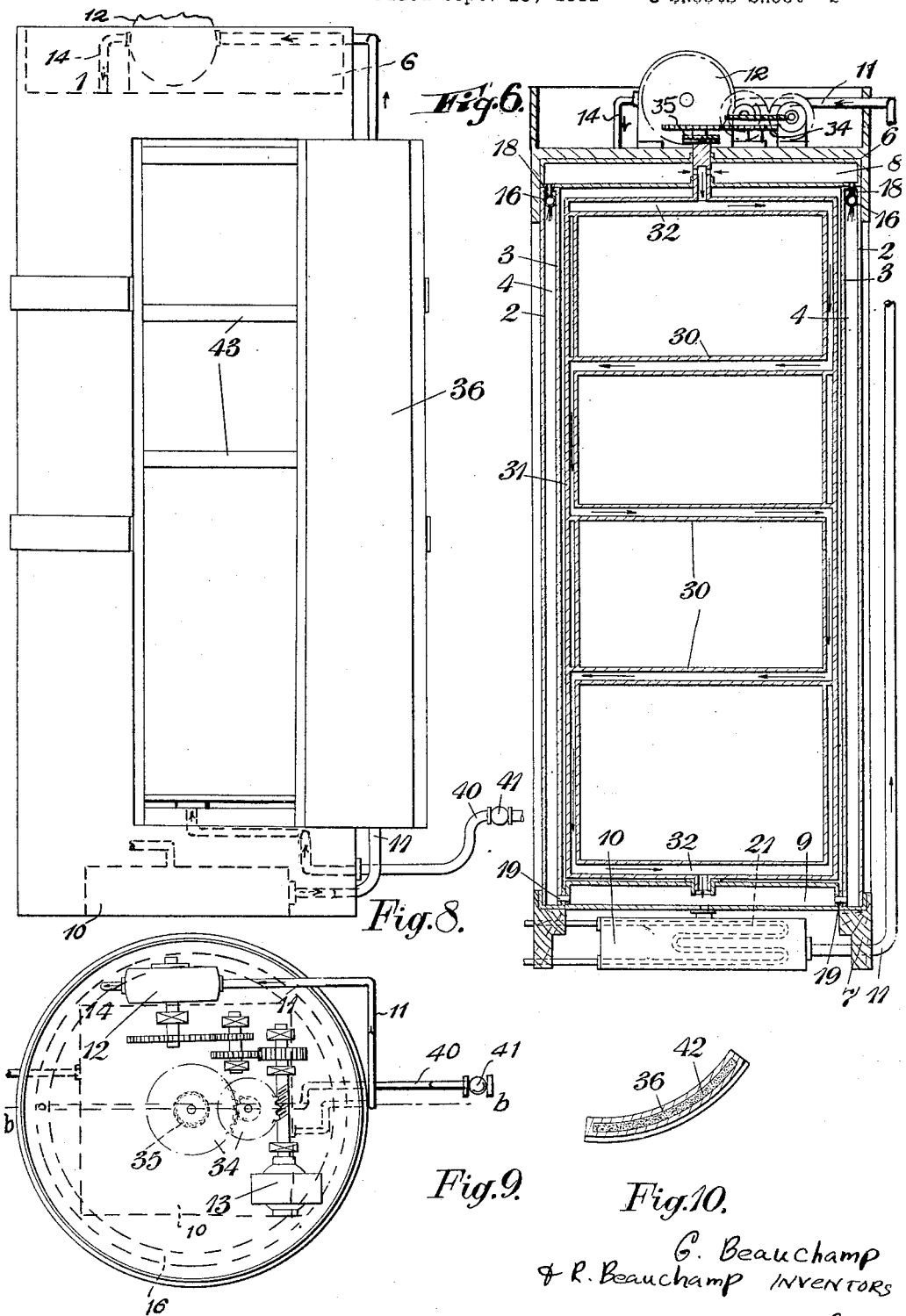

April 26, 1932. G. W. B. BEAUCHAMP ET AL 1,855,817
TEMPERATURE MAINTAINING APPARATUS
Filed Sept. 16, 1931 3 Sheets-Sheet 3

INVENTORS:
G. Beauchamp & R. Beauchamp
BY Marks & Clerk
ATTORNEYS.

Patented Apr. 26, 1932

1,855,817

UNITED STATES PATENT OFFICE

GILBERT WALTER BEACHIM BEAUCHAMP AND ROSS STEEDS BEACHIM BEAUCHAMP, OF STRATTON ON THE FOSSE, ENGLAND

TEMPERATURE MAINTAINING APPARATUS

Application filed September 16, 1931, Serial No. 563,196, and in Great Britain April 2, 1930.

This invention relates to apparatus such as containers, cabinets, chests and like appliances for maintaining therein a temperature either above or below that of the atmosphere.

An object of the invention is to provide an apparatus which may be used for several purposes such as a heater, a cooler or a sterilizer.

A further object of the invention is to provide an apparatus in which the contents can be clearly seen.

Another object of the invention is to provide an apparatus which will be capable of sterilizing articles, such as milk cans and bottles, and then when they are filled with milk and replaced in the apparatus will then be capable of maintaining them cool.

According to this invention the apparatus comprises a circular or polygonal cabinet having double or treble walls and the spaces between these walls can be used as containers or passages for the heating or cooling medium.

The appliance within the receptacle consists of a series of shelves with their supports which may be rotatable about a vertical axis or provided with top and bottom pivot points so that the shelves and their supports can be rotated. When the walls of the cabinet are constructed of glass, mica or other transparent material they have the further advantage of making visible the inner contents of the cabinet.

When it is desired to use the cabinet for sterilization purposes steam can be introduced to the inside of the cabinet, through pipe-connections or the equivalent which pass through the walls, floor or ceiling of the cabinet.

In a modified form the jackets or spaces between the walls may be used for hot-air or hot water instead of for cooling media.

A preferred form of the invention will now be described with reference to the accompanying drawings, in which:—

Figure 1:
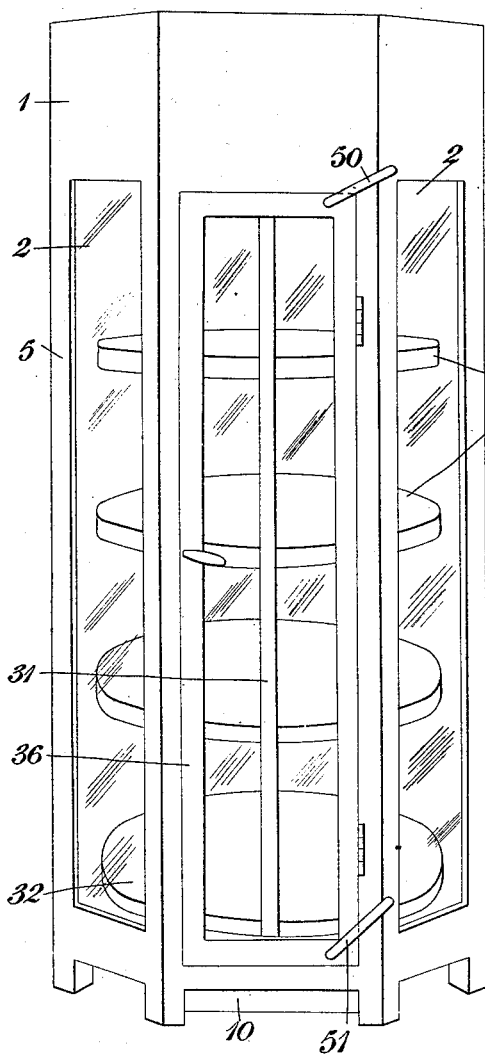
Figures 2, 3, 4:
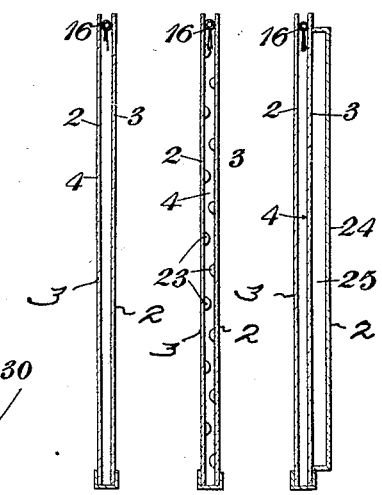
Figure 5:
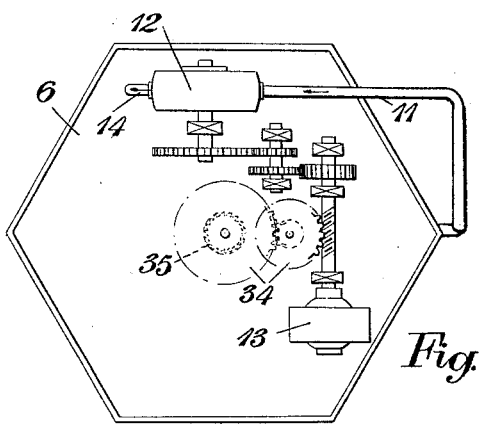
Figure 11:
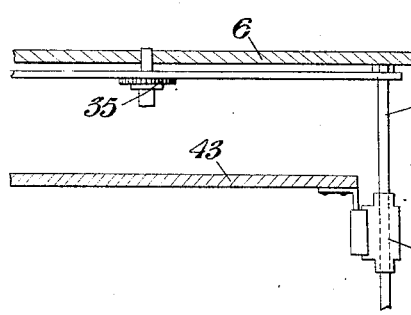
Figure 7:
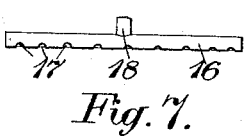
Figure 12:
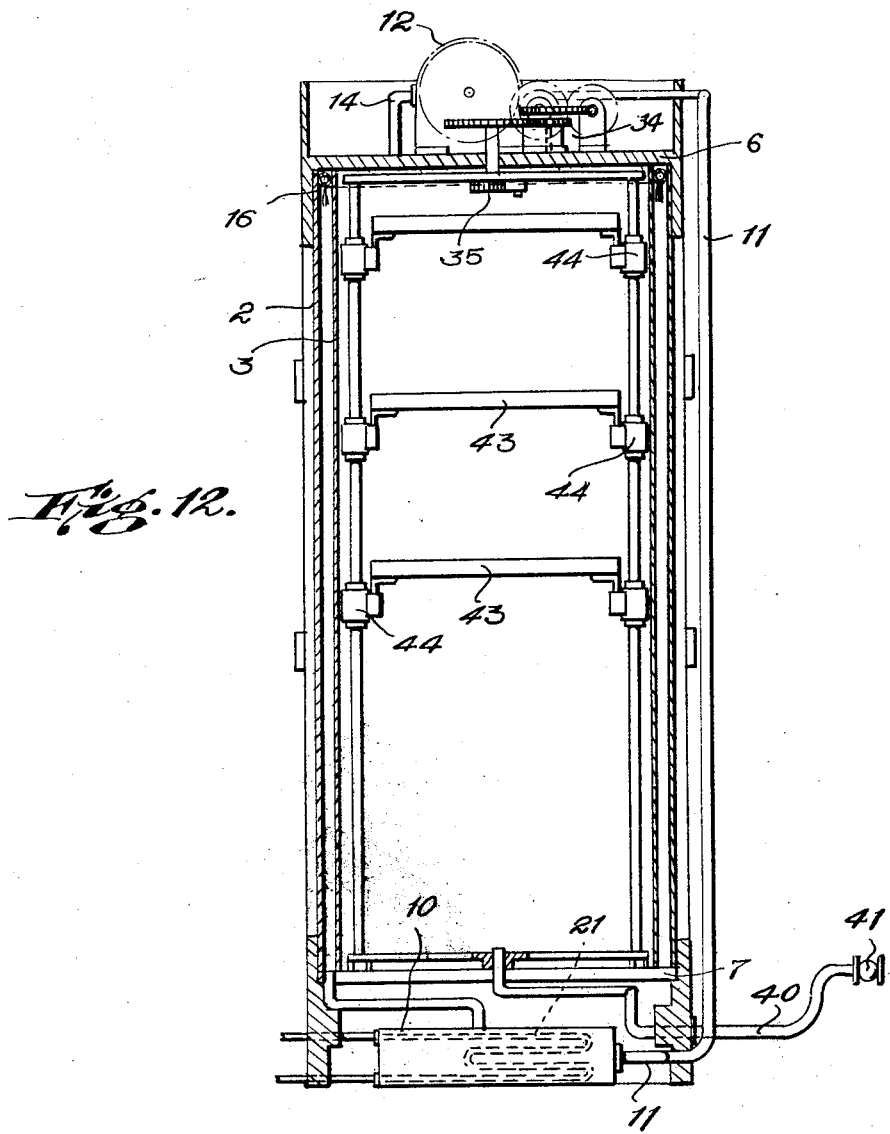

Figure 1 is a perspective view of a cabinet.
Figure 2 is a vertical section of one of the walls of Figure 1.
Figure 3 is a modification of Figure 2.
Figure 4 is a vertical section of one of the walls having two jackets.
Figure 5 is a plan view of Figure 1.
Figure 6 is a diagrammatic section of Figure 1.
Figure 7 shows a detail.
Figure 8 shows another form of receptacle showing the steam connections for sterilizing.
Figure 9 is a plan of Figure 8.
Figure 10 is a detail in section.
Figure 11 is a diagrammatic section of the trays showing a portion only.
Figure 12 is a sectional view of the device of Figures 8 and 11.

Referring to Figures 1 to 6 the container or cabinet 1 is hexagonal in form and each side of the hexagon is formed as a double wall by means of two transparent sheets 2, 3 of a suitable material such as glass or mica separated a suitable distance apart to form a jacket or chamber 4 as shown in Figure 2. A suitable framing 5 of any desired material is provided to support the sheets 2, 3. The top 6 and bottom 7 of the container are also made with double walls so as to form jackets or chambers 8, 9. Below the bottom 7 is provided a chamber 10 having a pipe 11 leading therefrom and carried up to a pump 12 mounted on the top 6 which is driven by a motor 13, said pump having a delivery pipe 14 leading into the jacket 8.

At the top of each jacket 4 is provided a pipe 16 as shown in Figures 6 and 7 having a number of perforations 17 which discharge liquid down the sides 2, 3 of the jacket. These pipes 16 are connected by a pipe 18 to the chamber 8. Suitable pipes 19 at the bottom conduct the liquid to the chamber 9. Ice or iced water may be placed in the sump 10 or the sump 10 may be kept cool by a refrigerator coil 21.

The panels or sheets 2, 3 may be formed with protuberances 23, as shown in Figure 3, situated upon the inside so as to disperse the liquid over both panels. Further the sides of the container may be made with triple walls as shown in Figure 4, the outside wall 24 forming a second chamber 25 which is evacuated or partially evacuated so as to provide a vacuum insulation, or if desired other solid insulating material may be placed within said jacket.

Within the container are provided a number of shelves 30 which are supported upon a frame 31, 32 which is mounted in suitable bearings and is connected to the chamber 8. The frame 31, 32 is made hollow as well as the shelves 30 so that liquid from the chamber 8 flows down the uprights 31 and along the shelves in alternate directions.

The frame 32 is extended through the chamber 8 and is provided with suitable gearing 34 operated by the motor 13 in order to rotate the shelves. A suitable one-way clutch 35 is provided so that the shelves may be turned by hand to bring the articles placed in the container within easy reach of the door 36. Further the gearing may be disconnected so that the trays are only rotated by hand as and when required.

The door 36 is made to fit very securely in an air-tight manner so as to exclude the air in order to prevent any exchange of heat between the outside and inside of the container.

If it is desired to keep the contents of the container at a temperature above that of the atmosphere hot water is pumped up by the pump 12, the fluid being heated, for instance, by the coils 21 which can be supplied with steam or hot water. If desired hot-air or steam may be circulated within the jackets.

According to another form of the invention as illustrated in Figures 8, 9 and 10 the container 1 is made cylindrical and has double walls of an opaque material, such as sheet metal, in the jackets of which walls the cooling or heating fluid is circulated. In this case the top 6 and bottom 7 may be solid, as shown in Figures 11 and 12, or they may be hollow, as shown in Figure 6, and may be filled with suitable insulating material or with the cooling or heating medium. If desired, the walls may be treble as shown in Figure 4 and the outer jacket may be filled with rarefied air or other insulating material.

The apparatus shown in the above Figures 8 to 12 is more particularly adapted to be used as a double purpose machine, i. e. as a cooler and as a sterilizer. For this purpose a steam pipe 40 having a suitable stop cock 41 is taken up through the bottom 7 of the container so as to fill the container with steam and sterilize any articles placed therein, such, for instance, as milk bottles and churns. When using the receptacle as a sterilizer the fluid medium is preferably removed from the jackets which then are filled with air and thus provide efficient insulating means. A section of the door 36 is shown in Figure 10 having the jacket filled with insulating material 42 or, if desired, this may be filled with rarefied air or with heating or cooling medium by means of flexible pipes as shown in Figure 1. The shelves 43 are preferably solid as shown in Figure 11 and may be adjustable in height by means of the support 44 sliding upon the upright 45.

The container 1 in Figure 1 may be formed with the top 6 and bottom 7 solid, as shown in Figures 11 and 12, and if desired the door 36 may have the cooling or heating medium passed therethrough by means of flexible tubes 50, 51, connecting it to the top and bottom jackets 8, 9 respectively. Further the shelves may be solid and adjustable in height as shown in Figure 11.

It is to be understood that we do not limit ourselves to the exact form and construction illustrated in the drawings which are only given by way of example and that various other constructions and alterations in details may be made without departing from the scope of the claims.

Having now described our invention what we claim as new and desire to secure by Letters Patent is:—

1. An apparatus for maintaining temperatures therein other than those of the atmosphere, comprising a cabinet having double walls, shelves within said cabinet rotatable on an axis, means for circulating a fluid between the walls of the cabinet and in contact with the shelves and means for rotating the shelves on their axis.

2. An apparatus for maintaining temperatures therein other than those of the atmosphere, comprising a cabinet having double walls around its sides and ends with a space between the walls, shelves within the cabinet having an axis, means for circulating fluid between the walls on the sides and at the ends of the cabinet and in contact with the shelves and means for rotating the shelves on their axis.

3. A cabinet having double walls with a space between the walls, a rotatable frame in the cabinet and means to circulate a fluid through the space between the walls, means to introduce a fluid into the cabinet in contact with the shelves and means to rotate the shelves.

4. A device for sterilizing and then refrigerating food articles, comprising, a frame carrying shelves rotatable in the cabinet, means whereby a sterilizing fluid may be introduced against the shelves, said cabinet having double walls with a space between the walls and means for circulating a refrigerating fluid through said space between said walls.

In testimony whereof we have signed our names to this specification.

GILBERT WALTER BEACHIM BEAUCHAMP.
ROSS STEEDS BEACHIM BEAUCHAMP.